(12) United States Patent
Shah

(10) Patent No.: US 9,402,175 B2
(45) Date of Patent: *Jul. 26, 2016

(54) SELECTION OF ROAMING GATEWAY

(71) Applicant: T-Mobile USA, Inc., Bellevue, WA (US)

(72) Inventor: Mehul Jayant Shah, Sammamish, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/268,809

(22) Filed: May 2, 2014

(65) Prior Publication Data

US 2014/0242980 A1    Aug. 28, 2014

Related U.S. Application Data

(63) Continuation of application No. 12/371,532, filed on Feb. 13, 2009, now Pat. No. 8,750,863.

(51) Int. Cl.
*H04Q 7/10* (2006.01)
*H04W 8/02* (2009.01)
(Continued)

(52) U.S. Cl.
CPC ............... *H04W 8/02* (2013.01); *H04W 48/17* (2013.01); *H04W 8/085* (2013.01); *H04W 8/26* (2013.01); *H04W 76/022* (2013.01); *H04W 80/04* (2013.01); *H04W 88/16* (2013.01)

(58) Field of Classification Search
CPC ......... H04W 8/02; H04W 88/16; H04W 8/04; H04W 48/18; H04W 8/12

USPC .................... 455/432.1, 433, 435.1; 370/328, 370/330–336, 352–356

See application file for complete search history.

(56) References Cited

U.S. PATENT DOCUMENTS

| 6,067,452 A | 5/2000 | Alexander |
| 6,563,919 B1 | 5/2003 | Aravamudhan et al. |

(Continued)

FOREIGN PATENT DOCUMENTS

| KR | 10-2006-0022937 A | 3/2006 |
| WO | WO 03/084185 A1 | 10/2003 |
| WO | WO 2009/022750 A2 | 2/2009 |

OTHER PUBLICATIONS

3GPP TS 23.401 (V8.0.0, Dec. 2007).
(Continued)

*Primary Examiner* — Patrick Edouard
*Assistant Examiner* — Julio Perez
(74) *Attorney, Agent, or Firm* — Knobbe, Martens, Olson & Bear, LLP

(57) ABSTRACT

A system and method for selecting a proxy gateway server for controlling data traffic initiated by a user device roaming on a visited network is disclosed. The method includes utilizing a mobility anchor server associated with the visited network to receive a request to activate a data traffic session from a user device, identify the user device as a roaming user device, and select a proxy gateway server from one or more servers associated with the visited network for controlling the data traffic initiated by the roaming user device. The selection of a proxy server is accomplished by querying a DNS server associated with the visited network with a pre-defined roaming APN string associated with the visited network and, in response to the query, receiving an Internet Protocol (IP) address of the proxy gateway server from the DNS server.

22 Claims, 5 Drawing Sheets

(51) Int. Cl.
*H04W 48/00* (2009.01)
*H04W 8/08* (2009.01)
*H04W 8/26* (2009.01)
*H04W 76/02* (2009.01)
*H04W 80/04* (2009.01)
*H04W 88/16* (2009.01)

(56) References Cited

U.S. PATENT DOCUMENTS

| | | | |
|---|---|---|---|
| 6,600,738 B1 | 7/2003 | Alperovich | |
| 6,788,676 B2 | 9/2004 | Partanen et al. | |
| 7,698,432 B2 | 4/2010 | Short et al. | |
| 7,702,346 B2 | 4/2010 | Choksi | |
| 7,925,762 B1* | 4/2011 | Kauppinen | H04W 8/12 370/328 |
| 8,000,689 B2 | 8/2011 | Featherstone et al. | |
| 8,321,584 B2 | 11/2012 | Dobbins et al. | |
| 8,520,609 B2* | 8/2013 | Singh | H04L 69/161 370/329 |
| 8,594,073 B2* | 11/2013 | Sugimoto | H04W 8/065 370/352 |
| 8,634,788 B2 | 1/2014 | Wright et al. | |
| 2006/0018291 A1 | 1/2006 | Patel et al. | |
| 2006/0028998 A1 | 2/2006 | Lioy et al. | |
| 2006/0077926 A1* | 4/2006 | Rune | H04L 45/34 370/328 |
| 2006/0085543 A1 | 4/2006 | Hrastar et al. | |
| 2006/0104262 A1 | 5/2006 | Kant et al. | |
| 2006/0133317 A1* | 6/2006 | Hurtta | 370/331 |
| 2007/0097997 A1 | 5/2007 | Maclean et al. | |
| 2007/0115934 A1 | 5/2007 | Dauster et al. | |
| 2007/0283022 A1 | 12/2007 | Rajko et al. | |
| 2008/0160972 A1 | 7/2008 | Haran et al. | |
| 2008/0263632 A1 | 10/2008 | Keon | |
| 2009/0034512 A1 | 2/2009 | Bantukul et al. | |
| 2009/0037595 A1 | 2/2009 | Breau et al. | |
| 2009/0047947 A1* | 2/2009 | Giaretta et al. | 455/432.1 |
| 2009/0086705 A1 | 4/2009 | Zisimopoulos | |
| 2009/0161575 A1 | 6/2009 | Zhao et al. | |
| 2009/0298478 A1 | 12/2009 | Tyhurst et al. | |
| 2009/0305671 A1 | 12/2009 | Luft et al. | |
| 2010/0027448 A1 | 2/2010 | Puthiyandyil et al. | |
| 2010/0095317 A1 | 4/2010 | Toebes et al. | |
| 2010/0234025 A1 | 9/2010 | Julka | |
| 2010/0284278 A1 | 11/2010 | Alanara | |
| 2011/0106946 A1 | 5/2011 | Bao et al. | |

OTHER PUBLICATIONS

3rd Generation Partnership Project (3GPP); Technical Specification Group Services and System Aspects; Feasibility Study for Transport and Control Separation in the PS CN Domain (Release 4).

3rd Generation Partnership Project; Technical Specification Group Core Network and Terminals; IP Multimedia (IM) Session Handling; IM Call Model; Stage 2 (Release 8).

3rd Generation Partnership Project; Technical Specification Group Core Network and Terminals; Numbering, Addressing and Identification (Release 8).

3rd Generation Partnership Project; Technical Specification Group Core Network and Terminals; Signalling Flows for the IP Multimedia Call Control Based on SEssion Initiation Protocol (SIP) and Session Description Protocol (SDP); Stage 3 (Release 5).

3rd Generation Partnership Project; Technical Specification Group Services and System Aspects; General Packet Radio Service (GPRS) Enhancements for Evolved Universal Terrestrial Radio Access Network (E-UTRAN) Access (Release 8).

3rd Generation Partnership Project; Technical Specification Group Services and System Aspects; Internet Protocol (IP) based IP Multimedia Subsystem (IMS) Emergency Sessions (Release 7).

3rd Generation Partnership Project; Technical Specification Group Services and System Aspects; IP Multimedia Subsystem (IMS); Stage 2 (Release 8).

3rd Generation Partnership Project; Technical Specification Group Services and System Aspects; One Tunnel Functional Description (Release 7).

GPRS Roaming Guidelines.

Inter-Service Provider IP Backbone Guideline.

RFC2766—Network Address Translation-Protocol ; Translation by G. Tsirtsis and P. Srisuresh.

T-Mobile's 3G Speed Reduction Cap, BerryReporter.com <http://www.berryreporter.com/t-mobiles-3g-speed-reduction> [retrieved Aug. 28, 2014].

* cited by examiner

SELECTION OF ROAMING GATEWAY

CROSS-REFERENCE TO RELATED APPLICATION

This application is a continuation of U.S. patent application Ser. No. 12/371,532, entitled SELECTION OF ROAMING GATEWAY, and filed Feb. 13, 2009, the entirety of which is incorporated herein by reference.

BACKGROUND

Global System for Mobile communications (Groupe Spécial Mobile, or GSM) is the most popular standard for mobile phones in the world. One of many services provided by GSM allows a mobile device user to connect to, and browse, the Internet or other networks, such as the user's corporate Intranet. The system that provides the packet based Internet connections within GSM context is the General Packet Radio Services (GPRS) system. This system is used by GSM for transmitting data in a form of the Internet Protocol (IP) packets.

The GPRS Core Network, also known as Packet Switched Core Network, is the centralized part of the GPRS system. A connection between a mobile device and the Core Network is provided by a Radio Access Network, a part of a mobile telecommunication system that implements a radio access technology.

Typically, every GSM mobile subscriber is afforded the capability, known as roaming, to automatically make and receive voice calls, send and receive data, or access other services, including home data services, when traveling outside the geographical coverage area of the home network, by means of using a visited network. The differentiation between a home network and a visited network is technically given by the type of subscriber entry in a specific network. If a subscriber has no entry in the home subscriber register of the network, the required subscriber data is first requested by the visited network, e.g., from the subscriber's home network in order that the subscriber can be authenticated and any authorization for using the network services can be checked.

When a roaming subscriber desires to access data services, the session of the mobile device with the Internet or other data network is established through a visited network Mobility Anchor node (server), a GPRS Roaming Exchange (GRX), and a home network Gateway node (server). The GPRS Roaming Exchange facilitates exchanging data messages between a visited network and home network using GPRS Tunnel Protocol which allows end users of a GSM network to move from place to place while continuing to connect to the Internet as if from one location. Thus, a data message originated by a roaming subscriber at the visited network, gets transmitted all the way from the visited network through GRX and on to the home network before exiting to the Internet or other data network. However, it could take a long time to complete this data traffic route due to great geographic distances between locations of home and visited networks, and therefore, data traffic efficiency may be adversely affected. This is particularly relevant in a case of real-time data traffic used in Voice Over IP (VOIP) messaging, where each voice data packet has to travel all the way to the home network before being routed to the correct destination.

A more efficient approach to routing data messages initiated in a visited network is to utilize the capabilities of the visited network itself, so that the visited network serves as a "proxy" for the home network. This concept would allow users to perform at least a number of functions on the visited network, that are ordinarily done on the home network, such as, for example, charging, statistics generation, accessing third-party networks, or legal interception. The concept requires a selection of a particular gateway node (server) in the network (a "Proxy Roaming Gateway") on the visited network that would serve as Roaming Gateway node for the data traffic. The Roaming Gateway node would proxy roaming traffic on to the home network for such purposes as, for example, charging, statistics generation, and/or legal interception.

However, the exact mechanism, which the Mobility Anchor node (server) would use to select a particular Proxy Roaming Gateway in the visited network, has not been developed. Therefore, there is a need for a method by which a Roaming Gateway can be selected for roaming subscribers accessing data services.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

A system and method for selecting a proxy gateway server for controlling data traffic initiated by a user device roaming on a visited network is disclosed. The system comprises a mobility anchor server configured to process a request to activate a data traffic session from a user device, identify the user device as a roaming user device; and select a proxy gateway server from one or more servers on the visited network for controlling the data traffic initiated by the roaming user device. The selected proxy gateway server is configured to control the data traffic initiated by the roaming mobile device.

The method for selecting a proxy gateway server for controlling data traffic initiated by a user device roaming on a visited network includes receiving a request to activate a data traffic session from a user device, identifying the user device as a roaming user device, and selecting a proxy gateway server from one or more servers associated with the visited network for controlling the data traffic initiated by the roaming user device.

In one disclosed embodiment, the selection of a proxy server is accomplished by querying a DNS server associated with the visited network with a pre-defined roaming APN string associated with the visited network and, in response to the query, receiving an Internet Protocol (IP) address of the proxy gateway server from the DNS server.

A selected proxy server receives a request to activate a data traffic session from a mobility anchor server associated with the visited network, determines that the request was initiated by a mobile device roaming on the visited network, and forwards the request to a home gateway server associated with the home network of the mobile device. The proxy server then forwards a Packet Data Protocol (PDP) IP address associated with the home network, received in response to the forwarded request, to the mobility anchor server.

A computer-readable storage medium for storing computer-executable instructions which, when executed on a computer processor, cause the computer processor to perform a method for selecting a proxy gateway server for controlling data traffic initiated by a user device roaming on a visited network, is also disclosed.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

Figure 1:
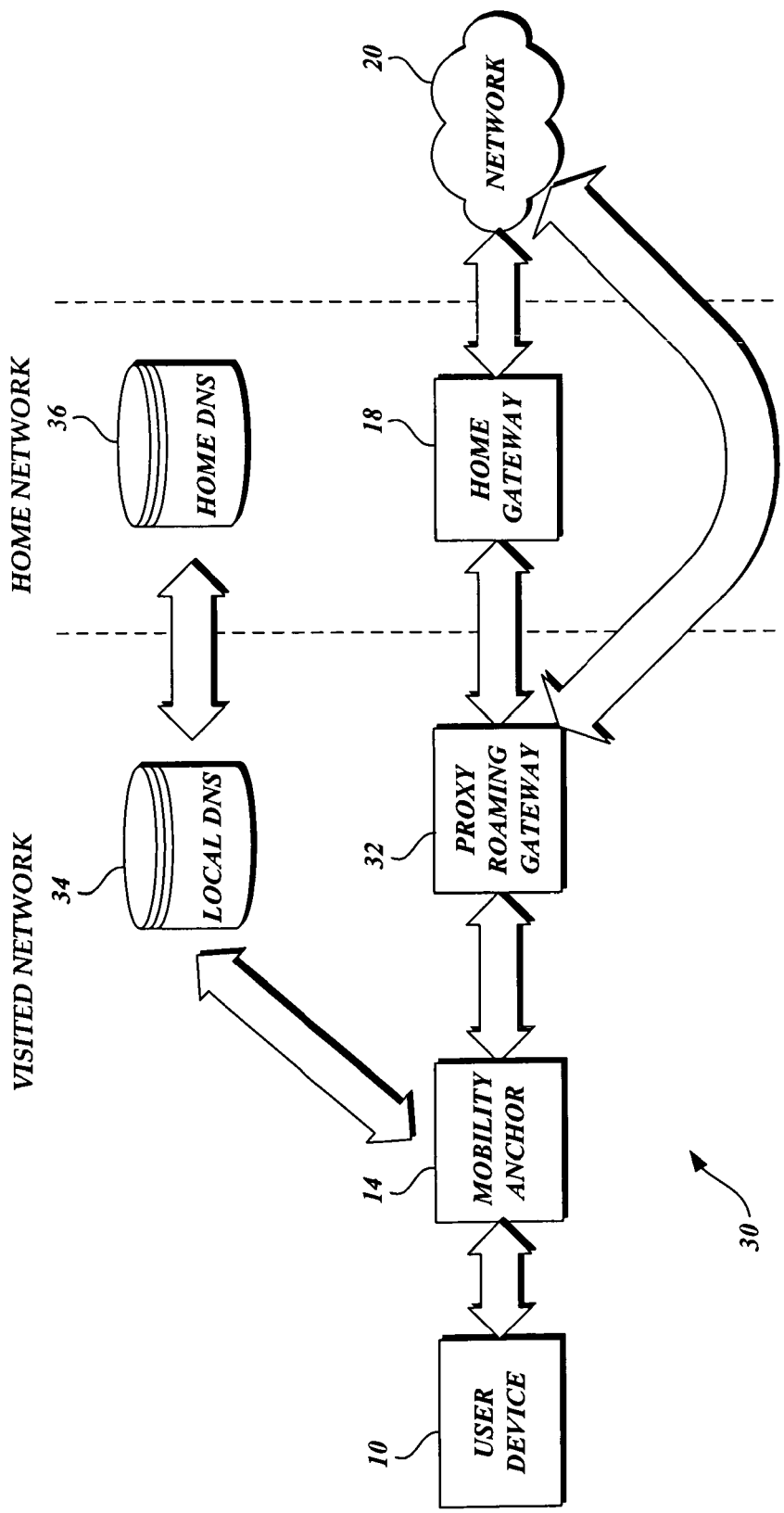
FIG. 1 is a block diagram illustrating a network environment in which a roaming mobile device accesses a data network.

An embodiment of a system and method for selecting a proxy gateway server for controlling data traffic initiated by a user device roaming on a visited network is described below. In the embodiment described, the selection of a proxy gateway server occurs when the user device is recognized as a roaming device by analyzing the Access Point Name (APN) associated with the device. The selection of the proxy gateway server is then accomplished by querying a DNS server associated with the visited network with a pre-defined roaming Access Point Name string generated by the visited network and, in response to the query, receiving an Internet Protocol (IP) address of the proxy gateway server from the DNS server.

The elements of a network that facilitate a mobile device's access to the network's data services will now be described. Those skilled in the art will appreciate that the term "mobile device" should not be construed as limiting as any type of a user device may be used in order to access data services of a network. Examples of mobile device include, but are not limited to, cellular telephone, laptop computer, PDA's wireless access cards, desktop computer's wireless access cards, etc. However, the term "mobile device" will be used hereinafter for the purposes of simplicity.

A typical network includes a Mobility Anchor node (server) and a Gateway node (server). The Mobility Anchor node, called in one embodiment the Serving GPRS Support Node (SGSN), is responsible for the delivery of data packets from and to the mobile devices within its geographical service area. Its tasks include packet routing and transfer, mobility management, logical link management, and authentication and charging functions. The location register of the Mobility Anchor stores location information and user profiles (e.g., addresses used in the packet data network) of all GPRS users registered with this Mobility Anchor.

The Gateway node (server), called in one embodiment the Gateway GPRS Support Node (GGSN), acts as an interface between the GPRS Core Network and the external packet data networks (Radio Access Network and the IP network). It decapsulates the tunneled GPRS data packets coming from the Mobility Anchor and sends them out on the corresponding packet data network. In the other direction, PDP addresses of incoming data packets are used to find the correct routing information so that the packets can be forwarded to the responsible Mobility Anchor. For this purpose, the GGSN stores the current Mobility Anchor address of the user and his or her profile in its location register. The Gateway node is responsible for IP address assignment (either from its internal IP address pool or by utilizing Dynamic Host Conference Protocol (DHCP) server or Remote Authentication Dial In User Service (RADIUS) server) and is the default router for the connected mobile device. The Gateway node also performs charging functions.

A typical process of accessing a data network through GPRS by a mobile device is as follows. When a mobile device wants to use GPRS, it first attaches and then activates a PDP context. The PDP context is a data structure present on both the Mobility Anchor (SGSN) and the Gateway (GGSN), which contains the subscriber's session information when the subscriber has an active session. This action allocates a PDP context data structure in the SGSN, that the subscriber is currently visiting and the GGSN serving the subscriber's access point for GPRS. When a GPRS mobile device sets up a PDP context, the access point for GPRS is selected and an Access Point Name (APN) that identifies an external network accessible from a mobile device is determined. The Access Point Name is then used in a Domain Name System (DNS) query to a private DNS network. This process, often called APN resolution, finally gives the IP address of the GGSN which should serve the access point. At this point, a PDP context can be activated and the mobile device's data session initiates.

The above process of activating a PDP context and APN resolution should be followed when a roaming subscriber accesses a data network through a visited network. As discussed in the Background section, a beneficial approach to routing data messages initiated in a visited network would be to utilize the capabilities of the visited network itself, so that the visited network serves as a "proxy" for the home network. One embodiment of the method of accessing a data network by a roaming subscriber's mobile device using a Proxy Roaming Gateway is provided below.

FIG. 1 illustrates a network environment 30 in which a roaming mobile device may access a data network using a Proxy Roaming Gateway node. The network environment comprises a visited network and home network.

As described above, in order for a subscriber's mobile device 10 to initiate a session using GPRS, a PDP context is created and activated. The session allocates a PDP context data structure in the Mobility Anchor 14 that the subscriber is currently visiting. In case of a roaming subscriber, the Mobility Anchor 14 recognizes that the PDP context includes a "foreign APN," i.e., an APN that is associated with a mobile device that is roaming in the "foreign" network through which the subscriber wants to initiate the session. The determination of whether the APN included in the mobile device's request is a "foreign APN" can be made, for example, by comparing it against a list of home APNs or, in another example, by parsing the complete APN format structure (Network Identifier and Operator Identifier, as defined by the GSM standards) by the Mobility Anchor. The ways to determine the "origin" of an APN are well known in the art.

The Mobility Anchor 14 of the visited network then replaces the foreign APN with a predefined Roaming APN string. The Roaming APN string is a name that is associated with the visited network and is used in a DNS query to identify a particular network server as a Proxy Roaming Gateway. A Roaming APN string may be stored at any storage associated with the network. For example, in one embodiment, a Roaming APN string may be stored at a Mobility Anchor 14. Alternatively, a Roaming APN string may be generated by the network when requested.

In one embodiment, when the network is configured to have one server designated as a Proxy Roaming Gateway, the Roaming APN string may be configured such that it "rigidly" identifies this particular server as a Proxy Roaming Gateway every time a roaming subscriber is detected on the network. In other embodiments, a Roaming APN string may be selected from a plurality of Roaming APN strings in accordance with certain criteria. For example, a Roaming APN string may be selected depending on a "foreign APN." If a "foreign APN" is associated with a certain European network, the Roaming APN string that would be used in a DNS query could be selected from a plurality of strings that correspond to a server or servers that are designated to serve as a proxy for this European network customers.

It will be appreciated by those skilled in the art that different criteria of selecting Roaming APN strings and various ways of associating Roaming APN strings with proxy servers could be used. For example, a Roaming APN string may be selected such that it selects a server on the network that is least congested and thus would best perform the "proxy" functions for roaming mobile devices.

It will be appreciated by those skilled in the art that a plurality of Roaming APN strings may be stored in a table that would link each string to the string selection criteria. By way of example, Roaming APN strings may be linked in such table to particular "foreign APNs" that are associated with certain "foreign" networks, connected to the visited network by roaming agreements.

Based on a selected predefined Roaming APN string, the Mobility Anchor 14 conducts a DNS query in order to identify a Proxy Roaming Gateway 32, to which the PDP context request may be sent. The DNS query returns an IP address of a selected Roaming Gateway 32, which will be used as a proxy Gateway.

Then, the Mobility Anchor 14 conducts another DNS query, this time using a "foreign APN," in order to determine a home network Home Gateway 18, to which the subscriber request is directed. This DNS query uses the standard GRX DNS procedures that involve the Local DNS 34 and Home DNS 36 and are known in the art. The result of this query is the APN resolution and the determination of an IP address of a Home Gateway. Having determined the IP addresses of a Proxy Roaming Gateway 32 and Home Gateway 18, it becomes possible to activate a PDP context and subsequently initiate the subscriber's session with the network 20 or, in one embodiment, with a third party using a Proxy Roaming Gateway 32. Thus, the selected visiting network Gateway node serves as a Proxy Roaming Gateway, thus controlling data traffic initiated by the roaming subscriber's mobile device.

Figure 2:
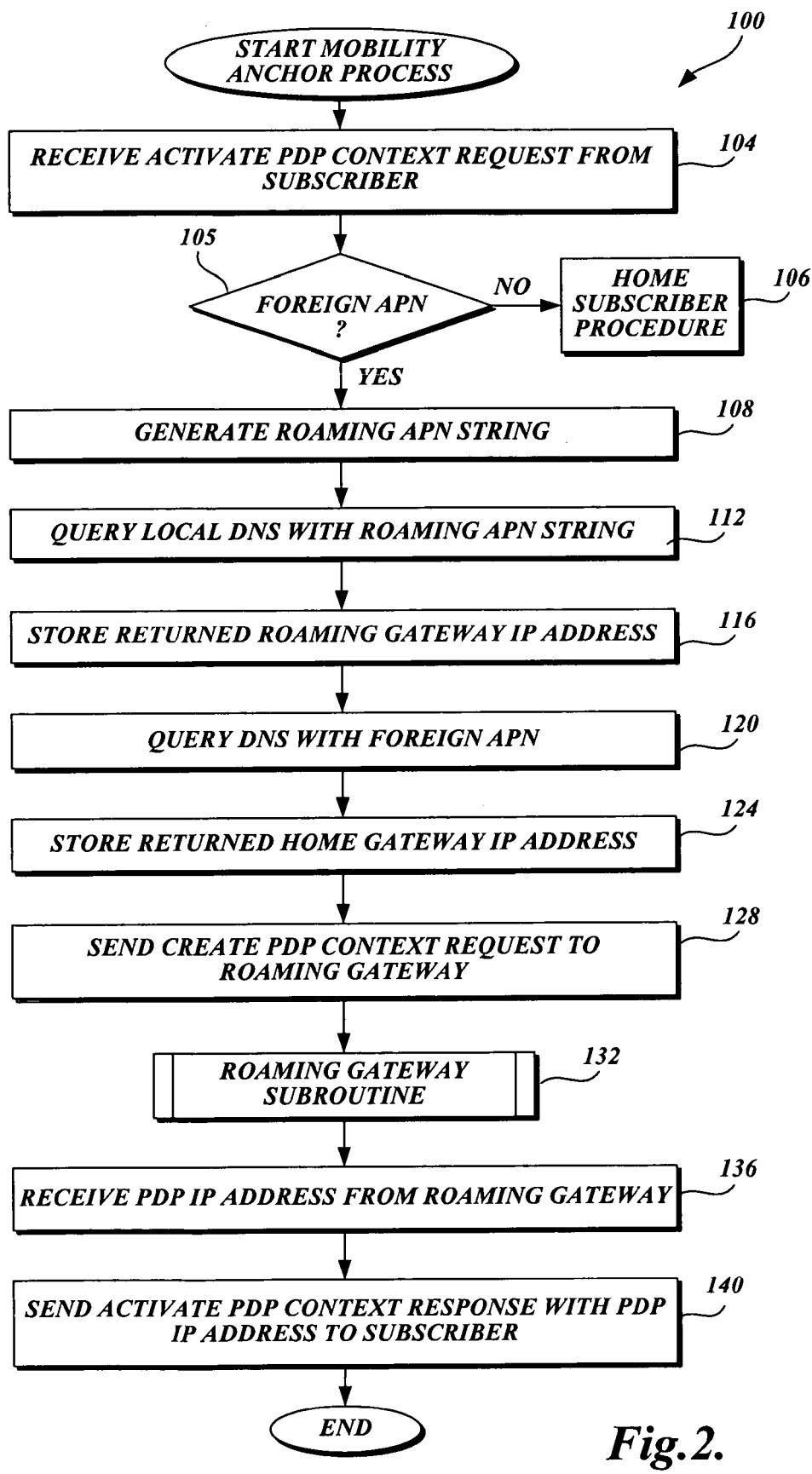
FIG. 2 is a flow diagram illustrating the operation of the visited network Mobility Anchor node in selecting a Proxy Roaming Gateway node for a roaming mobile device in accordance with an embodiment of the disclosed technology.

Referring to FIG. 2, a flow diagram 100 describes the operation of the visited network Mobility Anchor in the process of selecting a Proxy Roaming Gateway for accessing a data network by a roaming subscriber's mobile device. At block 104, the Mobility Anchor receives a request to activate PDP context from the roaming subscriber's mobile device. At decision block 105, a determination is made whether the request contains a "foreign APN." If it is determined that the request does not contain a foreign APN, the subscriber is identified as a "home" subscriber and the Mobility Anchor operates in accordance with an appropriate procedure, as block 106 identifies. The operation of the Mobility Anchor in regard to a "home" subscriber is not the subject of the present method and therefore is not described herein.

If it is determined that the request contains a foreign APN, at block 108 the pre-determined roaming APN string is generated. At block 112, the Mobility Anchor initiates a query of a local DNS using the roaming APN string. At block 116, the Mobility Anchor stores in its memory the Roaming Gateway IP address returned by the query. At block 120, another DNS query is conducted, directly or indirectly to the home DNS to determine the Home Gateway IP address, this time with the foreign APN contained in the Activate PDP Context request. At block 124, the Mobility Anchor stores the Home Gateway IP address returned by a query. At block 128, the Mobility Anchor sends the Create PDP Context request to the Roaming Gateway identified by its IP address. The request contains the Home Gateway IP address identified at block 120. At block 132, the Roaming Gateway subroutine illustrated in FIG. 3 and described in greater detail below is performed The execution of the subroutine results with the identification of a PDP IP address allocated by the home network. At block 136, the Mobility Anchor receives the PDP IP address from the Roaming Gateway subroutine. Finally, at block 140, the Mobility Anchor sends Activate PDP Context Response with PDP IP address to the roaming subscriber's mobile device.

Figure 3:
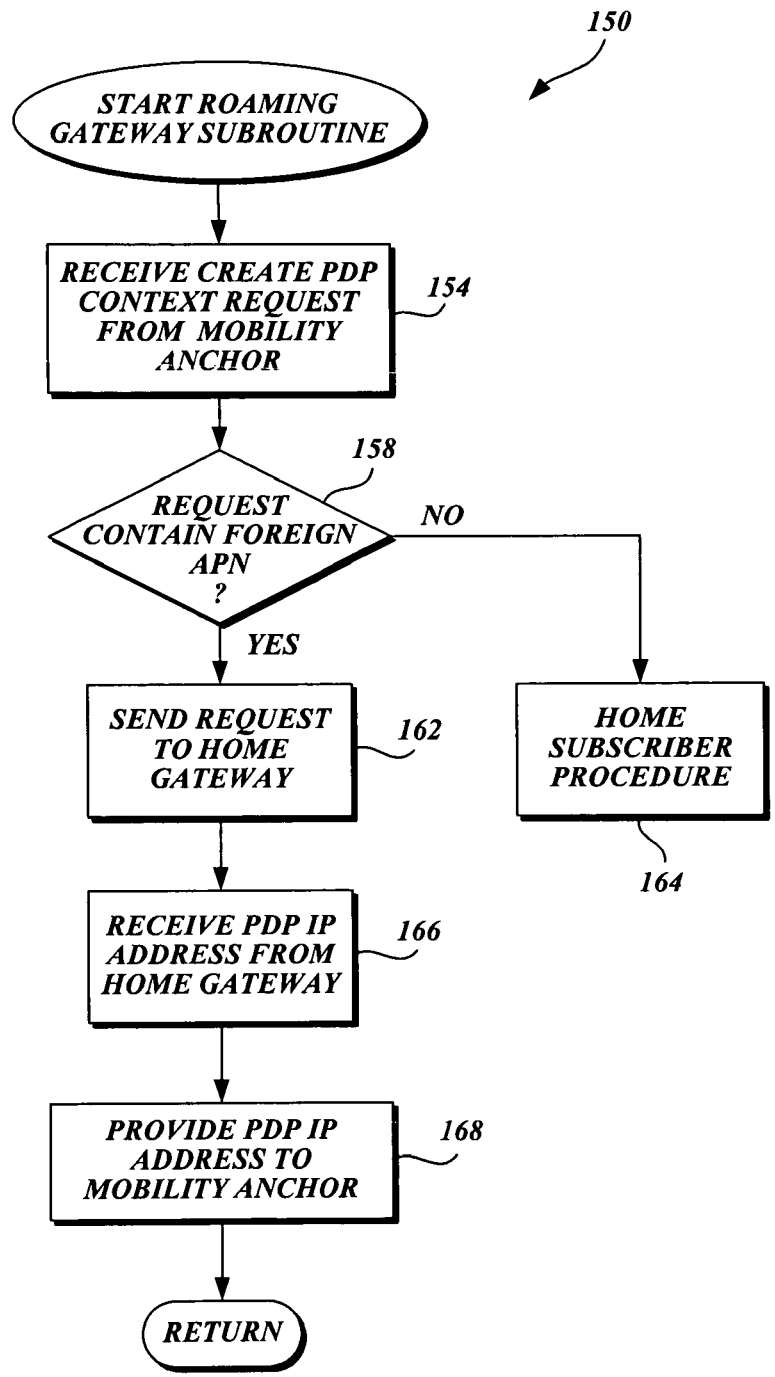
FIG. 3 is a flow diagram illustrating a Proxy Roaming Gateway subroutine for processing an activate data session request from a roaming mobile device.

FIG. 3 illustrates the Roaming Gateway subroutine 150. Note that at this point the Roaming Gateway "does not know" whether it will serve as a Proxy Roaming Gateway. At block 154, the Roaming Gateway receives the Create PDP Context request from the Mobility Anchor. At decision block 150, a determination is made whether the request contains a "foreign APN." If it is determined that the request does not contain a foreign APN, the subscriber is identified as a "home" subscriber and the Roaming Gateway operates in accordance to an appropriate procedure, as block 164 identifies. The operation of the Roaming Gateway in regard to a "home" subscriber is not the subject of the present method and therefore is not described herein.

If it is determined that the request contains a foreign APN, at block 162, the Roaming Gateway recognizes that it acts as a "proxy" towards the home network and forwards the request to the Home Gateway. At block 166, the PDP IP address is received from the Home Gateway in response to the request. Finally, at block 168, the PDP IP address is provided to the Mobility Anchor, after which the subroutine returns.

Figure 4:
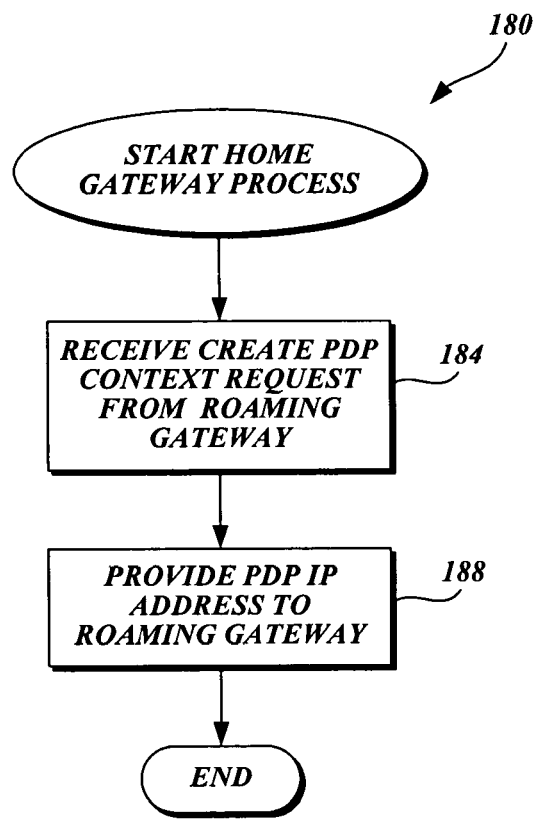
FIG. 4 is a flow diagram illustrating a role of the home network Gateway node in the process of initiating a data traffic session by a roaming mobile device using a Proxy Roaming Gateway.

FIG. 4 illustrates the operation 180 of the Home Gateway in the process described above. At block 184, the Home Gateway receives the Create PDP Context request from the Roaming Gateway (refer to block 162 of the Roaming Gateway subroutine illustrated in FIG. 3). At block 188, the Home Gateway provides a PDP IP address back to the Roaming Gateway in response to the above request (refer to block 166 of the Roaming Gateway subroutine illustrated in FIG. 3), after which the Home Gateway operation ends.

Figure 5:
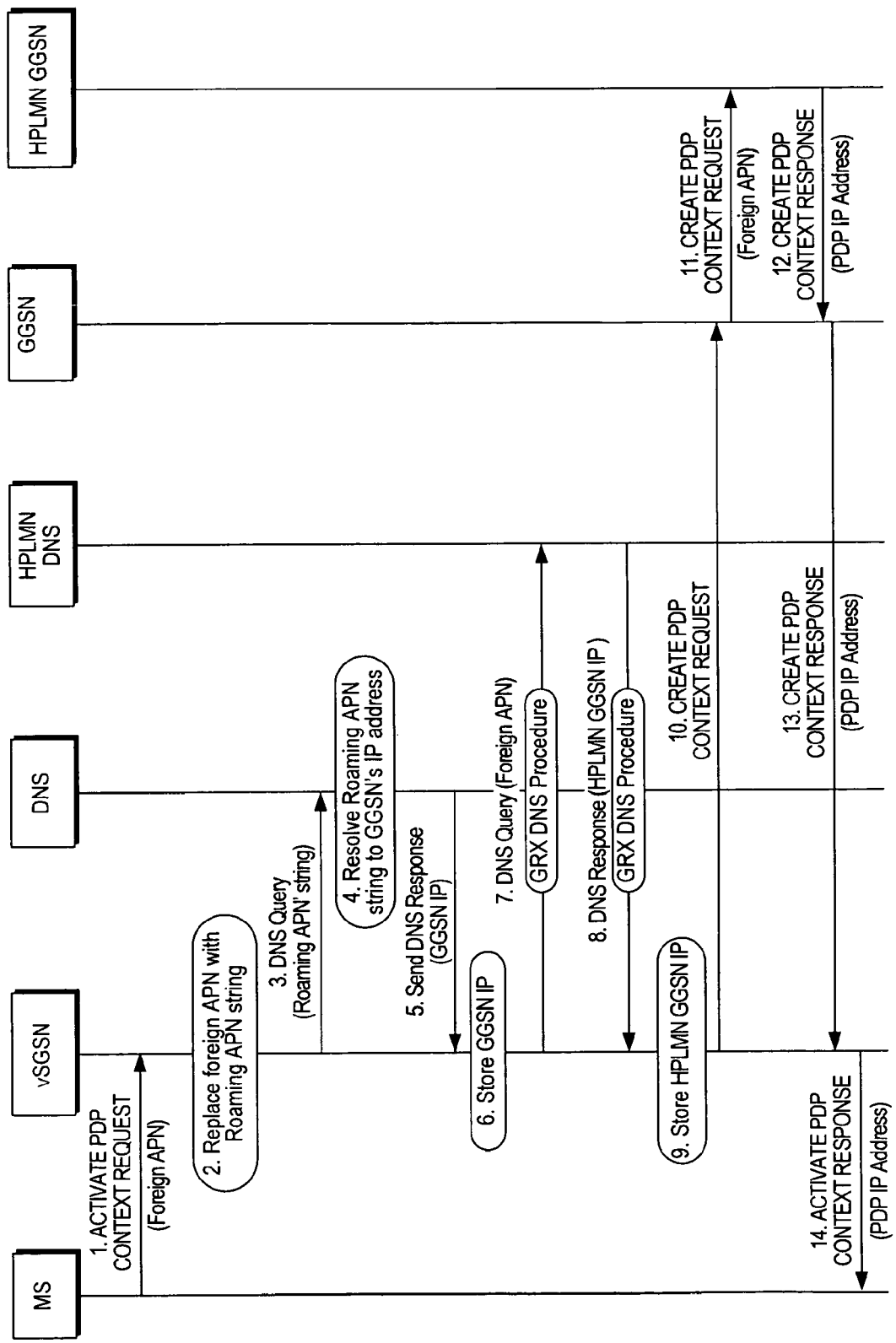
FIG. 5 is a state diagram illustrating the implementation of the method for initiating a data traffic session for a roaming subscriber's mobile device using a Proxy Roaming Gateway in the GPRS Core Network environment.

An embodiment that describes the selection of the Roaming Gateway in the visited network for roaming GPRS subscribers is illustrated by a state diagram in FIG. 5.

At step 1, the roaming subscriber's mobile device MS sends the Activate PDP Context Request to the visited network Mobility Anchor (vSGSN). The request has a "foreign APN."

At step 2, the Mobility Anchor (vSGSN) recognizes that the PDP context is for a roaming subscriber based on the "foreign APN." The Mobility Anchor has to select a Roaming Gateway where this request from the roaming subscriber has to be sent. The Mobility Anchor replaces the foreign APN with a pre-defined roaming APN string.

At step 3, the Mobility Anchor (vSGSN) performs a DNS query with a pre-defined roaming APN string. (A single "roaming APN string" can be used for all roamers or several roaming APN strings can be used depending on the network operator preference.)

At step 4, the DNS is configured to return the IP address of a Roaming Gateway in the visited network where this roaming traffic can be sent.

At step 5, the DNS responds to the query. The DNS response contains the IP address of the Gateway (GGSN) that is to be used as a Roaming Gateway.

At step 6, the Mobility Anchor (vSGSN) stores the returned IP address by the DNS.

At steps 7 and 8, the Mobility Anchor (vSGSN) performs a DNS query with the original "foreign APN" that was contained in the Activate PDP Context request from the roaming subscriber's mobile device. This is done so that the Roaming Gateway can proxy the request from the MS to the appropriate home network Gateway (HPLMN GGSN). The query is processed by the GPRX Roaming Exchange (GRX) according to standard procedures known in the art. For example, in one embodiment, the local DNS sends the request to the GRX DNS, the GRX DNS returns the IP address of the home DNS (HPLMN DNS) in the home network (HPLMN) that is responsible for the resolution of the query, the local DNS then proxies the request to the home DNS for the resolution of the foreign APN, and the home DNS returns the IP address of the Gateway (HPLMN GGSN) that hosts the foreign APN. The local DNS in turn relays the returned home Gateway (HPLMN GGSN) IP address back to the Mobility Anchor (vSGSN).

At step 9, the Mobility Anchor (vSGSN) may store or cache the returned IP address of the HPLMN GGSN for future use.

At step 10, the Mobility Anchor (vSGSN) sends the Create PDP Context request to the Roaming Gateway in the visited network identified by its IP address stored at the Mobility Anchor (vSGSN) at step 6. The request also contains the HPLMN GGSN IP address as one of the parameters.

At step 11, the Roaming Gateway (GGSN) recognizes that it has to act as a "proxy" towards the home network by the presence of the "foreign APN" and the additional home network Gateway (HPLMN GGSN) IP address field in the Create PDP Context Request message received from the vSGSN. The request is forwarded to the home Gateway (HPLMN GGSN).

At step 12, the home Gateway (HPLMN GGSN) responds to the request with the allocated PDP IP address, which is sent to the Roaming Gateway (GGSN). Standard Gn interface messages are used between the Roaming Gateway and the home Gateway.

At step 13, the Mobility Anchor (vSGSN) receives the response back from the Roaming Gateway (GGSN).

Finally, at step 14, the Mobility Anchor (vSGSN) responds back to the roaming subscriber's mobile device (MS) with the Activate PDP Context response, which contains the PDP IP address allocated by the home network.

As one skilled in the art would appreciate, steps 9-12 are the standard procedures used today for all roaming requests. Thus, no detailed description of steps 9-12 is provided herein.

While illustrative embodiments have been illustrated and described, it will be appreciated that various changes can be made therein without departing from the scope of the invention.

What is claimed is:

1. A communication system for selecting a proxy gateway server for controlling data traffic initiated by a user device roaming on a visited network, the system comprising:
    a mobility anchor server configured to:
        process a request to activate a data traffic session from a user device;
        identify the user device as a roaming user device;
        obtain a network address of a proxy gateway server associated with a visited network based, at least in part, on a pre-defined roaming access point name string associated with the visited network, wherein the network address of the proxy gateway service is obtained by querying a domain name system server associated with the visited network with the pre-defined roaming access point name string;
        identify a home gateway server associated with a home network based on a foreign access point name string associated with the home network, wherein the user device corresponds to a home device associated with the home network, wherein the pre-defined roaming access point name string is determined based, at least in part, on the foreign access point name string, and wherein the home gateway server provides a network address for identifying the user device during the data traffic session; and
        forward the request to activate the data traffic session to the proxy gateway server.

2. The communication system of claim 1, wherein the proxy gateway server directs the data traffic initiated by the roaming user device to a third-party network.

3. The communication system of claim 1, wherein the network address of the proxy gateway server corresponds to an Internet Protocol (IP) address.

4. The communication system of claim 1, wherein the pre-defined roaming access point name string is determined based on a criterion for selecting the proxy gateway server.

5. The communication system of claim 4, wherein the criterion specifies a particular proxy gateway server for any and all identified roaming user devices.

6. The communication system of claim 4, wherein the criterion corresponds to a geographic attribute associated with the foreign access point name string.

7. The communication system of claim 4, wherein the criterion corresponds to a measure of congestion associated with the proxy gateway server.

8. The communication system of claim 4, wherein the criterion corresponds to a roaming agreement between the home network and the visited network.

9. The communication system of claim 1, wherein the proxy gateway server obtains the network address for identifying the user device from the home gateway server.

10. A computer-implemented method for selecting a proxy gateway server for controlling data traffic initiated by a user device roaming on a visited network, the method comprising:
    processing a request to activate a data traffic session from a user device;
    identifying the user device as a roaming user device;
    identifying a proxy gateway server associated with a visited network based, at least in part, on a pre-defined roaming access point name string associated with the visited network, wherein identifying the proxy gateway server comprises querying a domain name system server associated with the visited network with the pre-defined roaming access point name string;
    identifying a home gateway server associated with a home network based on a foreign access point name string associated with the home network, wherein the user device corresponds to a home device associated with the home network, wherein the pre-defined access point name string is determined based, at least in part, on the foreign access point name string, and wherein the home gateway server provides a network address for identifying the user device during the data traffic session; and forwarding the request to activate the data traffic session to the proxy gateway server.

11. The computer-implemented method of claim 10, wherein the home gateway server is identified based on a DNS query using the foreign access point name string.

12. The computer-implemented method of claim 11 further comprising receiving an IP address of the home gateway server in response to the DNS query.

13. The computer-implemented method of claim 10 further comprising obtaining a Packet Data Protocol (PDP) IP address associated with the home network for the user device.

14. The computer-implemented method of claim 13, wherein the Packet Data Protocol IP address is obtained from the home gateway server.

15. The computer-implemented method of claim 13, wherein the Packet Data Protocol IP address associated with the home network for the user device is obtained in response to the request to activate the data traffic session.

16. The computer-implemented method of claim 10 further comprising determining the pre-defined access point name string based, at least in part, on the foreign access point name string.

17. A non-transitory computer-readable storage medium having computer-executable instructions which, when executed on a computer processor, cause the computer processor to:
   process a request to activate a data traffic session from a user device;
   identify the user device as a roaming user device;
   identify a proxy gateway server associated with a visited network based, at least in part, on a pre-defined roaming access point name string associated with the visited network, wherein identifying the proxy gateway server comprises querying a domain name system server associated with the visited network with the pre-defined roaming access point name string;
   identify a home gateway server associated with a home network based on a foreign access point name string associated with the home network, wherein the user device corresponds to a home device associated with the home network, wherein the pre-defined access point name string is determined based, at least in part, on the foreign access point name string, and wherein the home gateway server provides a network address for identifying the user device during the data traffic session; and
   forward the request to activate the data traffic session to the proxy gateway server.

18. The non-transitory computer-readable storage medium of claim 17, wherein the request to activate a data traffic session contains the foreign access point name string.

19. The non-transitory computer-readable storage medium of claim 18, wherein the computer-executable instructions include instructions for identifying the user device as a roaming user device based on the foreign access point name string.

20. The non-transitory computer-readable storage medium of claim 17, wherein the computer-executable instructions, when executed on a computer processor, cause the computer processor to receive from home gateway server a Packet Data Protocol IP address associated with the home network and allocated to the user device.

21. The non-transitory computer-readable storage medium of claim 20, wherein the computer-executable instructions, when executed on a computer processor, cause the computer processor to forward the Packet Data Protocol IP address to the user device.

22. The non-transitory computer-readable storage medium of claim 17, wherein the proxy gateway server obtains the network address for identifying the user device from the home gateway server.

\* \* \* \* \*